United States Patent [19]
Kane

[11] 4,044,477
[45] Aug. 30, 1977

[54] POOL MODELS

[76] Inventor: Robert J. Kane, 5035 N. 12th St., Phoenix, Ariz. 85011

[21] Appl. No.: 735,375

[22] Filed: Oct. 26, 1976

[51] Int. Cl.² .......................................... G09B 25/00
[52] U.S. Cl. .......................................... 35/49; 35/16
[58] Field of Search ................... 4/171, 172, 172.17, 4/172.18; 35/16, 29 B, 49, 51; 40/106.21; 46/91

[56] References Cited
U.S. PATENT DOCUMENTS

| 1,747,428 | 2/1930 | Crawford | 35/49 |
|---|---|---|---|
| 1,833,726 | 11/1931 | Stoddard | 35/49 |
| 1,954,561 | 4/1934 | Cygon | 35/51 |
| 3,541,705 | 11/1970 | Nelson | 40/106.21 X |

FOREIGN PATENT DOCUMENTS

| 397,533 | 8/1933 | United Kingdom | 35/16 |
|---|---|---|---|

OTHER PUBLICATIONS

"Earth Science Stream Table", No. 58100, p. 344, of Cenco 1969 Educational Catalog.

*Primary Examiner*—Harland S. Skogquist
*Attorney, Agent, or Firm*—Warren F. B. Lindsley

[57] ABSTRACT

Portable pool models for demonstrative and sales purposes to show prospective pool buyers the appearance of a given pool configuration landscaped to simulate a full-size pool in a ground installation on their property as well as illustrating and demonstrating the construction and maintenance of the water content and plumbing and electrical assemblies of the pool installation.

8 Claims, 5 Drawing Figures

U.S. Patent  Aug. 30, 1977  4,044,477
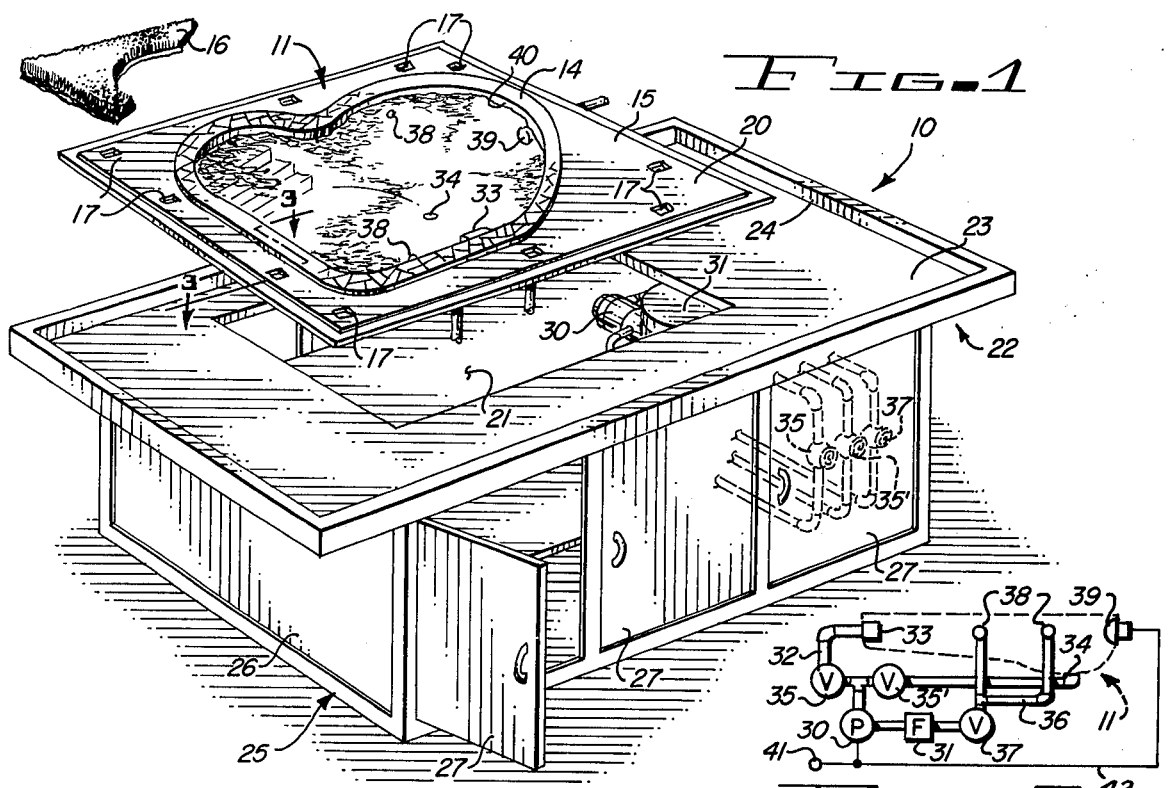
FIG-1
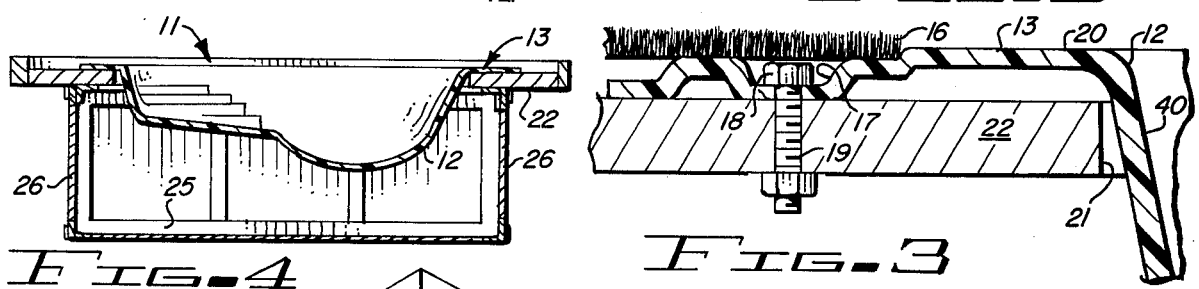
FIG-5
FIG-4
FIG-3
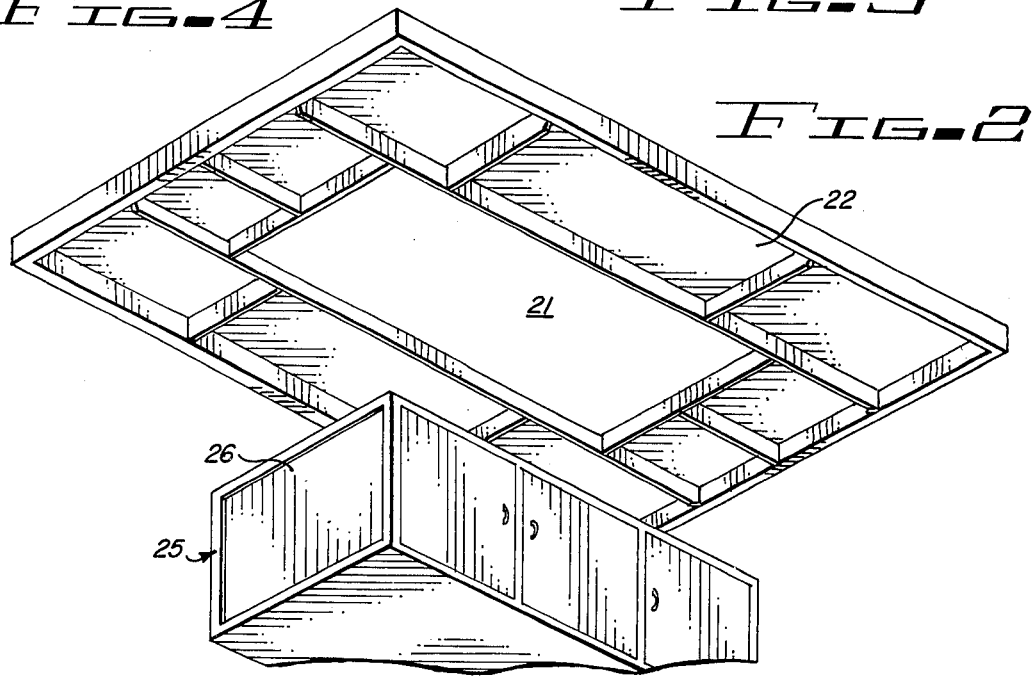
FIG-2

POOL MODELS

BACKGROUND OF THE INVENTION

The population shift of recent years toward the hot and arid regions of the Southwest has produced a growing interest in swimming pools and a rapid expansion of the swimming pool industry.

In this part of the country where it is too hot during a greater part of the year for most active sports, the family or neighborhood swimming pool offers a welcome relief from the oppressive summer heat as well as a means for the practice of one of the best known forms of health and body building exercise. Moreover, in this land of retirement communities, swimming and related forms of hydrotherapy are becoming increasingly popular as an effective form of treatment for arthritis and other ailments common among the aged.

Along with the increased popularity of swimming pools, there has been an attendant growth in the associated technologies with a growing list of equipment being added to the typical installation for the enhancement of the operating features and for the reduction of maintenance care. Such added equipment includes automatic cleaning and chlorinating appliances, aerators, heaters and more recently, the pumps and special fixtures associated with hydrotherapy.

In order that the benefits offered by the swimming pool may be realized and enjoyed by a greater percentage of the population, there is a need to reduce the complexity of the pool installation while retaining the worthwhile features it provides.

To aid the pool contractor, salesman, subcontractor and supplier of pool equipment in illustrating the appearance of a given pool configuration landscaped to simulate a full-size pool in a ground installation on a prospective customer's property as well as to demonstrate various types of pool equipment without the need of costly in-ground pool installations, relatively small fully operative demonstrative models are needed which may be set up and maintained in or outdoors and easily moved from one place to another with little expense and inconvenience.

SUMMARY OF THE INVENTION

In accordance with the invention claimed, a novel free-standing model-size pool assembly is provided which simulates the appearance of a given in-ground pool installation and which is fully operative for disclosing the component parts and operative characteristics of the pool assembly.

Since many pool builders take unfair advantage of an uninformed new pool owner, the disclosed models are designed as a teaching, informative and sales aid for illustrating and demonstrating various pool designs and associated equipment economically and in a relatively small space which models may be easily moved from one place to another with little time and expense.

It is, therefore, one object of the invention to provide new and improved fully operative pool models simulating the appearance of in-ground full-size installation.

Another object of this invention is to provide pool models which may be easily constructed, demonstrated and moved at will to serve as a teaching and informative sales aid.

A further object of this invention is to provide a fully operative novel pool assembly model which illustrates the appearance of a full-size pool and illustrates the relative position of its operating parts.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWING

The present invention may be more readily described by reference to the accompanying drawing in which:

FIG. 1 is a perspective view of a fully operative model of a swimming pool installation mounted on a supporting framework forming the top of a storage cabinet incorporating the invention;

FIG. 2 is an enlarged partial exploded view of the pool supporting top and enclosing cabinet walls shown in FIG. 1;

FIG. 3 is a partial cross-sectional view illustrating the means for bolting the pool to its supporting framework taken along the line 3—3 of FIG. 1.

FIG. 4 is a cross-sectional view of the model shown in FIG. 1;

FIG. 5 is a simplified diagrammatic illustration of the hydraulic and electrical system of the pool model shown in FIG. 1.

DESCRIPTION OF THE PREFERRED EMBODIMENT

Referring more particularly to the drawing by characters of reference, FIG. 1 discloses a model 10 of a swimming pool installation comprising a preformed swimming pool 11 formed or molded of suitable material such as rubber, plastic, fiberglass or the like having a cavity 12 surrounded by a flange 13 and defined by bottom and side walls.

Flange 13 comprises a first portion 14 substantially perpendicular to the peripheral edge of the cavity simulating the decking around a normal swimming pool and a second portion 15, the outer peripheral edges of which form any given configuration but may be, for example, a rectangular configuration. It should be noted that the upper surface of the second portion of the flange 13 is parallel with, but lower than, the upper surface of the first portion of the flange so that simulated sod 16 or other yard plantings or design configurations may be placed around decking of the pool and remain level with the top surface of the decking or below simulating the appearance of the ground around an in-ground pool. A plurality of identations are provided in the second portion of the flange for receiving the heads 18 of bolts 19 used for fastening the swimming pool 11 to its supporting structure and maintaining the head 18 of the bolt 19 equal with or below the top surface 20 of second portion 15 of the flange.

The cavity of the swimming pool 11 is supported within an aperture 21 of a cabinet top 22. The flange 13 of the swimming pool rests on the top surface 23 of top 22 with the outer peripheral edge 24 of top 22 extending equal with or above surface 23 as shown in FIG. 4.

Top 22 may be supported by a cabinet framework 25 as shown in FIGS. 1 and 2 having enclosing panels 26 and doors 27. The interior of the framework is used for storage and the equipment necessary for maintaining the pool.

Although the swimming pool installation 10 generally represents a model of the appearance of one type of swimming pool, any other pool geometrical configuration may be utilized herein and with model maintenance equipment associated with it to illustrate the specific operating characteristics of similar full-size in-ground geometrical pool configurations.

The swimming pool maintenance system comprises a pump 30 and filter 31 with the pump having the usual suction return line 32 as shown in FIG. 5 connected to it terminating at a skimmer outlet 33 and a main drain sump 34 through shut-off control valves 35, 35'. An outlet pressure supply line 36 connects the tank of filter 31 through a shut-off control valve 37 to one or more inlets 38 to the interior of pool 11.

A pool illuminating light 39 is installed in the wall 40 of the cavity forming the pool at its deep end which is connected together with pump 30 to a suitable source of electric power 41 through conductors 42. The power supply for these models may be, for example, a 12-volt supply of direct or alternating current.

If it is necessary to level the pool with reference to the cabinet top 22, such action may be accomplished by suitable adjustment of bolts 19 and the use of washers therewith in the well known manner or may be leveled by foot adjustments of the cabinet as known in the art.

OPERATION

With valves 35, 35', and 37 open and swimming pool pump 30 energized, water will circulate through filter 31 and back to the swimming pool through the skimmer 33, drain port 34 and inlets 38 in a manner well known in the art.

Although but one embodiment of the present invention has been illustrated and described, it will be apparent to those skilled in the art that various changes and modifications may be made therein without departing from the spirit of the invention or from the scope of the appended claims.

What is claimed is:

1. A model of a swimming pool installation comprising:

a swimming pool defining a cavity having bottom and side walls and a first flange having a first part extending around the edge of said cavity and substantially perpendicular thereto simulating a pool decking and a second part extending laterally from said first part around its free edge but coplanar therewith at a different level, the said free edge of said second part defining a given configuration, a cabinet for supporting said swimming pool having an apertured top, the aperture of said top being slightly larger than and of substantially the same geometrical configuration as the peripheral edge of said cavity, said first flange lying over the surface of said top of said cabinet for supporting the swimming pool positioned to extend into the aperture, said top having a second flange around its edge for receiving within its periphery the outer edge of said given configuration of said second part of said first flange, and a plurality of indentations formed in and around the periphery of said given configuration for receiving fastening means for securing said swimming pool to the top of said cabinet, whereby the fastening means when inserted in indentations lie below the top surface of said second part of said first flange.

2. The model set forth in claim 1 in further combination with:

landscaping means covering said second part of said first flange and any exposed surface of said top extending up to said second flange.

3. The model set forth in claim 1 wherein:
the cavity of said swimming pool is formed of a moldable material.

4. The model set forth in claim 1 wherein:
the cavity of said swimming pool is formed of plastic.

5. The model set forth in claim 1 wherein:
the cavity of said swimming pool is formed of fiberglass.

6. The model set forth in claim 1 in further combination with:

a filtering system including a pump and a filter tank,
a suction line connected to said pump,
a skimmer outlet and main drain sump mounted in said cavity and connected to said suction line,
an outlet pressure supply line connected between said filter tank and a circulating piping and inlets for said pool, and
at least one shut-off control valve arranged in each of said suction and supply lines,
said filtering system, suction line, outlet pressure supply lines and shut-off control valve being mounted in said cabinet.

7. The model set forth in claim 1 wherein:
said given configuration comprises a rectangular configuration.

8. The model set forth in claim 1 wherein:
said swimming pool and its cavity and associated flange including the first and second parts comprises a single unitary structure.

* * * * *